US008923530B2

(12) United States Patent
Diethorn et al.

(10) Patent No.: US 8,923,530 B2
(45) Date of Patent: Dec. 30, 2014

(54) SPEAKERPHONE FEEDBACK ATTENUATION

(75) Inventors: Eric John Diethorn, Long Valley, NJ (US); Heinz Teutsch, Green Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 934 days.

(21) Appl. No.: 12/422,087

(22) Filed: Apr. 10, 2009

(65) Prior Publication Data

US 2010/0260351 A1    Oct. 14, 2010

(51) Int. Cl.
| | |
|---|---|
| *H04B 15/00* | (2006.01) |
| *H04M 9/00* | (2006.01) |
| *H04M 9/08* | (2006.01) |
| *H04M 1/00* | (2006.01) |
| *H04M 1/60* | (2006.01) |
| *H04M 1/20* | (2006.01) |
| *H04M 1/62* | (2006.01) |

(52) U.S. Cl.
CPC .............. *H04M 1/6033* (2013.01); *H04M 1/20* (2013.01); *H04M 1/62* (2013.01)
USPC .......... 381/93; 381/94.2; 381/94.3; 379/55.1; 379/406.01; 379/406.02; 379/388.02; 379/388.07; 379/420.01; 379/420.02; 379/420.03

(58) Field of Classification Search
CPC ....... H04M 9/082; H04M 9/085; H04M 9/08; H04M 3/002; H04M 1/20; H04M 1/6033; H04M 1/62; H04B 3/20; H04B 3/237; H04B 3/238; H04B 3/002
USPC ........... 381/93, 94.2, 94.3; 379/55.1, 406.01, 379/406.02, 388.02, 388.03, 388.07, 379/420.01–420.03
See application file for complete search history.

(56) References Cited

U.S. PATENT DOCUMENTS

| | | | | |
|---|---|---|---|---|
| 5,121,426 | A | * | 6/1992 | Baumhauer et al. ..... 379/420.03 |
| 5,852,567 | A | | 12/1998 | Xia et al. |
| 8,054,991 | B2 | * | 11/2011 | Tokuda et al. .................. 381/92 |
| 8,385,557 | B2 | * | 2/2013 | Tashev et al. ................... 381/66 |
| 2005/0152487 | A1 | * | 7/2005 | Reichard ....................... 375/350 |
| 2005/0254640 | A1 | * | 11/2005 | Ohki et al. .................. 379/406.1 |

\* cited by examiner

*Primary Examiner* — Phat X Cao
*Assistant Examiner* — Diana C Vieira
(74) *Attorney, Agent, or Firm* — Maldjian Law Group LLC; John Maldjian; Alexander D. Walter

(57) ABSTRACT

A method is disclosed for acoustic feedback attenuation at a telecommunications terminal. A speakerphone equipped with a loudspeaker and two microphones is featured. Signals from the two microphones are subjected to a calibration stage and then to a runtime stage. The purpose of the calibration stage is to match the microphones to each other by advantageously using both magnitude and phase equalization across the frequency spectrum of the microphones. During the runtime stage, the microphones monitor the ambient sounds received from sound sources, such as the speakerphone's users and the loudspeaker itself, during a conference call. The speakerphone applies the generated set of filter coefficients to the optimized microphone's signals. By combining the signal from the reference microphone with the filtered signal from the optimized microphone, the speakerphone is able to attenuate the sounds from the loudspeaker that would otherwise be transmitted back to other conference call participants.

20 Claims, 6 Drawing Sheets

SPEAKERPHONE FEEDBACK ATTENUATION

FIELD OF THE INVENTION

The present invention relates to the field of telecommunications in general and, more particularly, to acoustic feedback cancellation.

BACKGROUND OF THE INVENTION

When a telephone is used in an electro-acoustic speakerphone mode, acoustic coupling or "feedback" between the loudspeaker and the microphone is likely to occur. When acoustic coupling occurs, sound produced by the loudspeaker is sensed by the microphone and retransmitted back to its original source, causing undesirable artifacts, such as screeching, to be heard by the call participants.

Three common approaches for minimizing acoustic coupling are:
  i. acoustic echo canceling,
  ii. automatic microphone mixers, and
  iii. the use of directional microphones.
Some background information for each approach is now provided.

In accordance with acoustic echo canceling, a digital adaptive filter models the acoustic coupling between conferencing system loudspeakers and conferencing system microphones (i.e., the "acoustic signature") in the room. The audio signal that feeds the local loudspeaker is filtered using the acoustic signature stored in the adaptive filter model. This filtered signal is then subtracted from the microphone signal before the signal is transmitted to the far end, resulting in an improved signal at least under some conditions. However, acoustic echo canceling has some limitations. First, the adaptive filter might take several seconds to adapt to changes in the acoustic signature of the room. Second, adaptation can only occur when the far-end party is talking but the local parties are not. As a result, if changes to the room's acoustic signature occur during a conversation—for example, the microphone moves or a local party's body moves with respect to the local microphones—then the far-end party will hear the artifacts of inadequate cancellation until the digital filter can re-adapt.

Automatic microphone mixers can also provide an effective means to minimize loudspeaker-to-microphone coupling when a mixing algorithm operating at the near end is able to consider the audio signal that is received from the far end. In this case, audio received from the far end has the effect of attenuating the signals from local (near-end microphones when the far-end party is talking. As a result, loudspeaker-to-microphone coupling at the near end is reduced by the amount that the automatic mixer attenuates the near end's microphone signals. Automatic mixers have the advantage of providing a cleaner audio feed to the far end, not only when a single near-end microphone is in use, but also when multiple local microphones are used. However, the disadvantage with this approach is that the teleconferencing system is no longer full-duplex.

Directional microphones can also be used to reduce acoustic coupling. When a directional microphone is positioned so that its region of minimum amplitude sensitivity facing towards the loudspeaker, most or all of the sound arriving from the direction of the loudspeaker is prevented from being sensed by the microphone. However, this comes at the cost of blocking sounds produced by a call participant when the participant is situated behind the loudspeaker in relation to the microphone. The apparent reduction in microphone amplitude sensitivity with respect to some call participants makes the use of directional microphones impractical.

What is needed is a method for minimizing acoustic coupling without some of the costs and disadvantages of the prior art.

SUMMARY OF THE INVENTION

The present invention provides a method for acoustic feedback attenuation without some of the costs and disadvantages of the prior art. A speakerphone telecommunications terminal, which is equipped with a loudspeaker and two microphones, operates in accordance with the illustrative embodiment. Signals from the two microphones are subjected first to a calibration stage and then a runtime stage.

The purpose of the calibration stage is to match the microphones to each other by advantageously using both magnitude and phase equalization across the frequency spectrum of the microphones, in contrast to using the amplitude of the time-domain signals as in some techniques in the prior art. Only one microphone has to be optimized with respect to the other microphone, which serves as a reference microphone. During the calibration stage, a calibration sound, such as a wideband stationary signal, is first played out of the loudspeaker. The microphones listen to the calibration sound, and a processor in the speakerphone samples the two signal streams. The processor considers the two signal streams in first formulating a design matrix and then solving a set of linear equations associated with the matrix, thereby yielding a set of filter coefficients to be used by the microphone being optimized. The set of filter coefficients can be subsequently applied to the signal received by the optimized microphone (i.e., during the runtime stage), resulting in a significant coupling reduction between the loudspeaker and the two microphones.

The calibration stage, in part, is based on the recognition of a near-field versus far-field effect, in which the loudspeaker is situated within the near field in relation to the microphones and one or more users are situated during an actual call within the far field (i.e., outside of the near field) in relation to the microphones. Advantageously, by performing both a magnitude and phase equalization on the calibration sound produced by the loudspeaker situated within the near field, the calibration stage is able to attenuate sounds emitted by the loudspeaker while allowing sounds to come through from a user in the same direction as the loudspeaker but who is situated in the far field.

During the runtime stage, in the course of a conference call in which the loudspeaker is used, the speakerphone's microphones monitor the ambient sounds received from acoustically-collocated sound sources, such as the speakerphone's users and the loudspeaker itself. In accordance with the illustrative embodiment, the speakerphone's processor applies the set of filter coefficients that was generated during the calibration stage, to the signals received by the optimized microphone. By combining the received signal from the reference microphone with the received, filtered signal from the optimized microphone, the speakerphone is able to attenuate sounds from its loudspeaker that would otherwise be picked up by the microphones and transmitted back to other telecommunications terminals involved in the conference call. Advantageously, because the filter coefficients reflect both a magnitude and phase equalization, the loudspeaker's sounds are more effectively attenuated than with some techniques in the prior art, and the user's voice is minimally affected.

The illustrative embodiment of the present invention comprises: receiving an ambient sound at a first microphone and at a second microphone from at least one of i) a person and ii) a loudspeaker, wherein the person and the loudspeaker are spatially distinct; and transmitting an electromagnetic signal that is based on: i) the ambient sound as received by the first microphone, ii) the ambient sound as received by the second microphone, and iii) a filter whose set of coefficients is based on the frequency spectrum of a calibration sound that is transmitted from the loudspeaker, the calibration sound comprising a stationary wideband signal.

DETAILED DESCRIPTION

Figure 1:
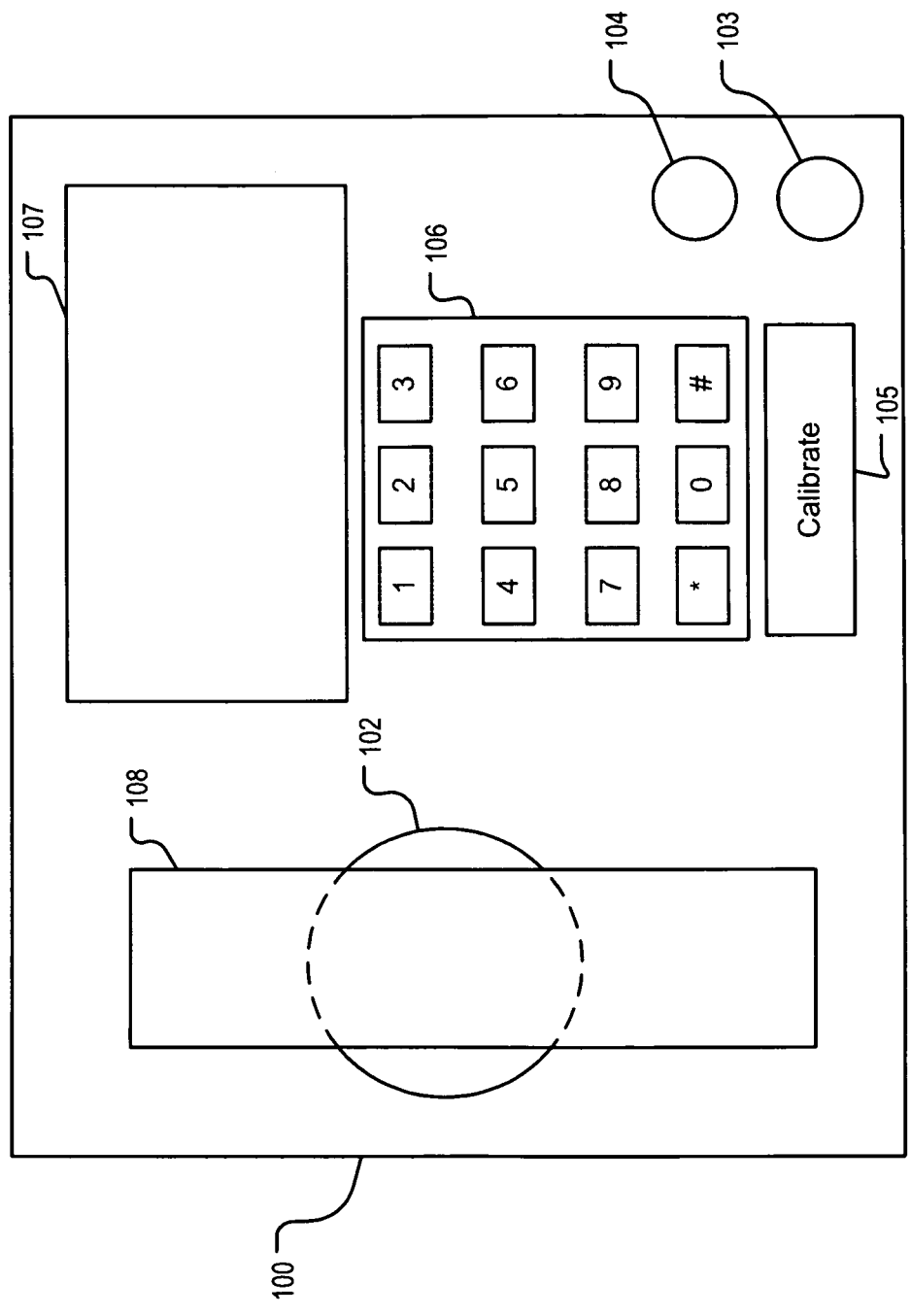
FIG. 1 depicts a schematic diagram of the salient components of telecommunication terminal 100 in accordance with the illustrative embodiment.

FIG. 1 depicts a schematic diagram of the salient components of telecommunication terminal 100 in accordance with the illustrative embodiment. Terminal 100 comprises loudspeaker 102, microphones 103 and 104, calibrate button 105, dial pad 106, display 107, and handset 108.

Telecommunication terminal 100 is a desk-set telephone receiver capable of operating in speakerphone mode. However, it will be clear to those skilled in the art, after reading this specification, how to make and use alternative embodiments in which telecommunication terminal 100 is any type of communication-device, such as cell phone, two-way radio, and so forth. Although telecommunication terminal 100 uses only one speaker, it will be clear to those skilled in the art, after reading this specification, how to make and use alternative embodiments of the present invention in which a plurality of speakers is used. It will also be clear to those skilled in the art, after reading this specification, how to make and use alternative embodiments in which telecommunication terminal 100 comprises more than two microphones.

Loudspeaker 102 is an electroacoustical transducer that converts electrical signals to sound. Loudspeaker 102 is used to reproduce sounds produced by one or more far-end telephone call participants. It will be clear to those skilled in the art how to make and use loudspeaker 102.

Microphones 103 and 104 are electroacoustical transducers. Each microphone receives sounds from one or more near-end call participants and converts the sounds to electrical signals. In accordance with the illustrative embodiment, microphones 103 and 104 are omnidirectional microphones. However, it will be clear to those skilled in the art, after reading this specification, how to make and use alternative embodiments in which other types of microphones are used, such as and without limitation subcardioid, cardioid, supercardioid, hypercardioid, bi-directional and shotgun. Furthermore, in accordance with the illustrative embodiment, microphones 103 and 104 are electret microphones, but it will be clear to those skilled in the art, after reading this specification, how to make and use alternative embodiments of the present invention in which each microphone can be any type of microphone, such as and without limitation a carbon microphone, a micro-electro-mechanical system microphone, laser microphone, a piezoelectric microphone, and so forth.

In accordance with the illustrative embodiment, distance $d_1$ between loudspeaker 102 and microphone 103 and distance $d_2$ between loudspeaker 102 and microphone 104 are such as to allow the spherical nature of the sound waves produced by loudspeaker 102 to be exploited. The spherical nature of the sound waves is characteristic of loudspeaker 102 being in the so-called "near field" in relation to microphones 103 and 104. The lengths of distances $d_1$ and $d_2$ depend on a variety of factors, such as and without limitation the exact geometry of loudspeaker 102, mounting of the loudspeaker, dimensions and shape of telecommunication terminal 100, air motion, properties of the microphones used to detect the acoustic signal, frequency range of the sound considered, and so forth. The values of distances $d_1$ and $d_2$ can be determined empirically by those skilled in the art without undue experimentation.

Microphones 103 and 104 are used to form a microphone array that is capable of achieving one-dimensional spatial selectivity. It will be clear to those skilled in the art, after reading this specification, how to make and use alternative embodiments in which a larger number of microphones are used to form the array. It will be also be clear to those skilled in the art how to make and use alternative embodiments in which a plurality of microphone arrays is used to achieve three-dimensional spatial selectivity.

Microphones 103 and 104 are operated as a differential array. Therefore, the spacing between microphones 103 and 104, in theory, is determined according to the formula $k*d_3 \ll \pi$, where (i) k is the wave number for the acoustic signal; and (ii) $d_3$ is the distance between the microphones. (See G. W. Elko, "Superdirectional Microphone Arrays" in "Acoustic Signal Processing for Telecommunication", pp. 181-237, Kluwer 2000, which is incorporated herein by reference). For an acoustic bandwidth frequency of 8000 Hz, which is the acoustic bandwidth of telecommunications terminal 100 in the illustrative embodiment, the formula yields a number much smaller than two centimeters. However, because most of the energy of human speech is concentrated at less than 1000 Hz, using a microphone spacing of two centimeters is sufficient. Although the illustrative embodiment features a microphone spacing of two centimeters, in some alternative embodiments the microphone spacing can be different than two centimeters, as those who are skilled in the art will appreciate.

Although the illustrative embodiment features a bandwidth of 8000 Hz, it will be clear to those skilled in the art how to make and use alternative embodiments of the present invention in which the bandwidth is either larger or smaller. Furthermore, it is to be understood that the above-mentioned spacing constraints are material only when the microphones are configured to operate in a differential fashion. It will be clear to those skilled in the art how to make and use alternative embodiments of the present invention in which the use of a differential microphone array is substituted with another technique, such as and without limitation using an array of directional microphones, single microphone suppression, blind source separation, and so forth.

Also depicted in FIG. 1 is calibrate button 105. Button 105 is an actuated switch, which when actuated causes telecommunication terminal 100 to return to the calibration phase of its operation. The calibration phase is described in further detail later in this specification. It will be clear to those skilled in the art, after reading this specification, how to make and use calibrate button 105.

Dial pad 106 is a telephone dial pad, display 107 is a telephone display, and handset 108 is a telephone handset, as are well-known in the art.

Figure 2:
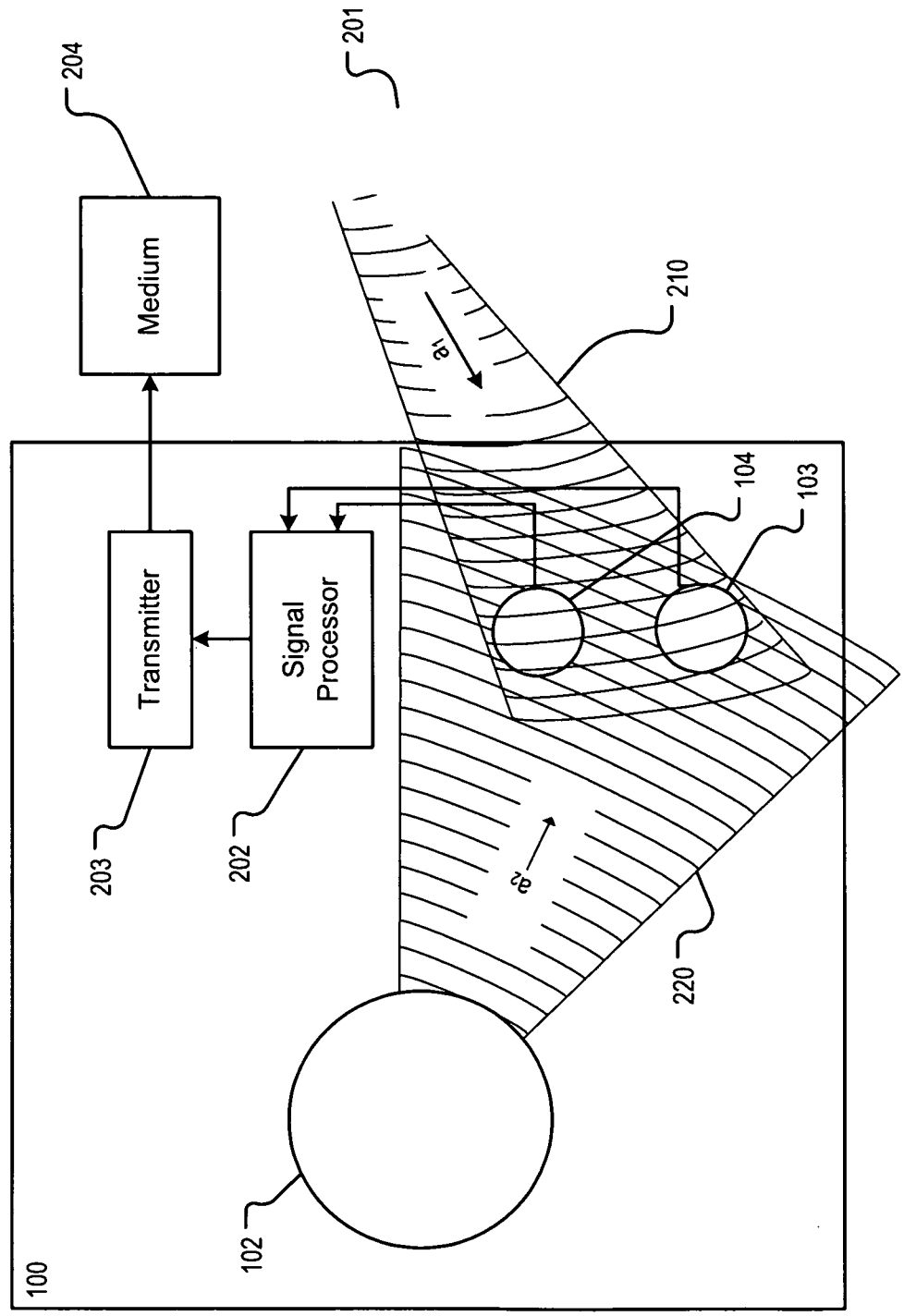
FIG. 2 depicts a schematic diagram of the salient components of telecommunications terminal 100 in operation as the terminal is used by near-end user 201 to make a phone call.

FIG. 2 depicts a schematic diagram of the salient components of telecommunications terminal 100 in operation as the terminal is used by near-end user 201 to make a phone call in accordance with the illustrative embodiment of the present invention. As an overview, microphones 103 and 104 are receiving acoustic signal 210 that originates from human user 201 and acoustic signal 220 that originates from loudspeaker 102. Combinations of the two signals are detected and transduced by microphones 103 and 104, and are provided to signal processor 202. The signal processor processes the transduced signals and provides them to transmitter 203. The transmitter then transmits the signals through communications medium 204 to one or more telecommunications terminals which are the intended recipients of the signals.

Sound signal 210 is an acoustic signal produced by human user 201, who is acoustically co-located with terminal 100 (e.g., located in the same conference room, etc.). The position of user 201 is physically distinct from that of loudspeaker 102, at least across the plane defined by loudspeaker 102 and microphones 103 and 104. Signal 210 arrives at microphones 103 and 104 along direction $a_1$. Sound signal 210 carries the speech of user 201 and it is intended to be heard by the far-end party.

In accordance with the illustrative embodiment, signal 210 originates from user 201, who is within the so-called "far-field" (i.e., outside of the near field) in relation to microphones 103 and 104. Because of this far-field characteristic, the acoustic wavefront of sounds from the user arrive at the microphones as a succession of essentially straight parallel lines.

Sound signal 220 is an acoustic signal produced by loudspeaker 102. It arrives at microphones 103 and 104 along direction $a_2$. In contrast to sound signal 210, sound signal 220 is not intended to be heard by the far-end party. Instead, sound signal 220 is to be attenuated by signal processor 202, in accordance with the illustrative embodiment.

Microphones 103 and 104 receive the combination of sound signals 210 and 220. Microphone 103 produces a first signal and microphone 104 produces a second signal, both of which are sampled in well-known fashion.

Signal processor 202 comprises hardware and software for processing telecommunication signals. Signal processor 202 receives the first sampled signal and the second sampled signal. The signal processor executes a set of tasks on the two signals in order to produce a filtered signal in which the near-field signals arriving along direction $a_1$ are attenuated. The tasks performed by signal processor 202 are described in greater detail later in the specification. It will be clear to those skilled in the art, after reading this specification, how to make and use signal processor 202.

Transmitter 203 is a telephone signal transmitter. Transmitter 203 receives the filtered signal produced by signal processor 202 and transmits it over communications medium 204. It will be clear to those skilled in the art, after reading this specification, how to make alternative embodiments of the present invention in which transmitter 203 is another type of transmitter, such as and without limitation a radio transmitter, an optical transmitter, and so forth.

Communications medium 204 is the medium over which telecommunication terminal 100 transmits signals. Medium 204 is a telephone wire, but it will be clear to those skilled in the art, after reading this specification, how to make and use alternative embodiments of medium 204 that comprise other communications media, such as and without limitation air, fiber optic cable, and so forth.

Figure 3:
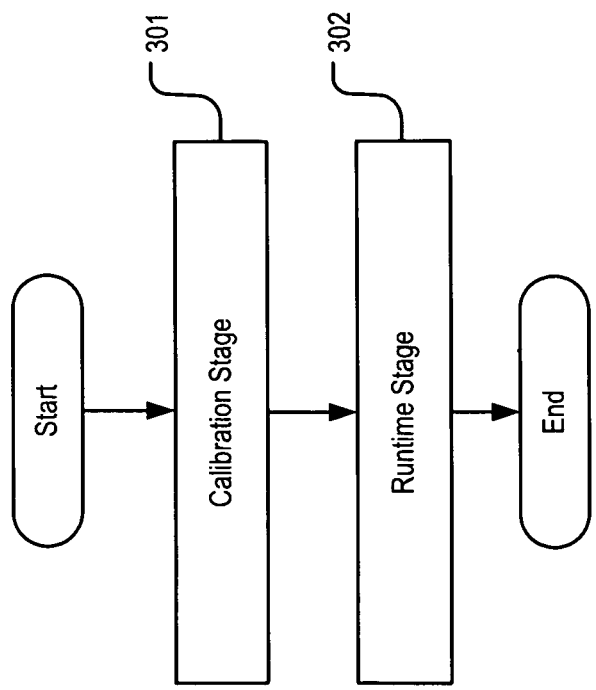
FIG. 3 depicts a flowchart of the salient stages in the operation of telecommunication terminal 301.

FIG. 3 depicts a flowchart of the salient stages in the operation of telecommunication terminal 100, in accordance with the illustrative embodiment of the present invention. The stages of operation comprise calibration stage 301 and runtime stage 302. It will be clear to those skilled in the art, after reading this specification, how to perform the tasks associated with FIG. 3 in a different order than presented or to perform the tasks simultaneously.

Figure 4:
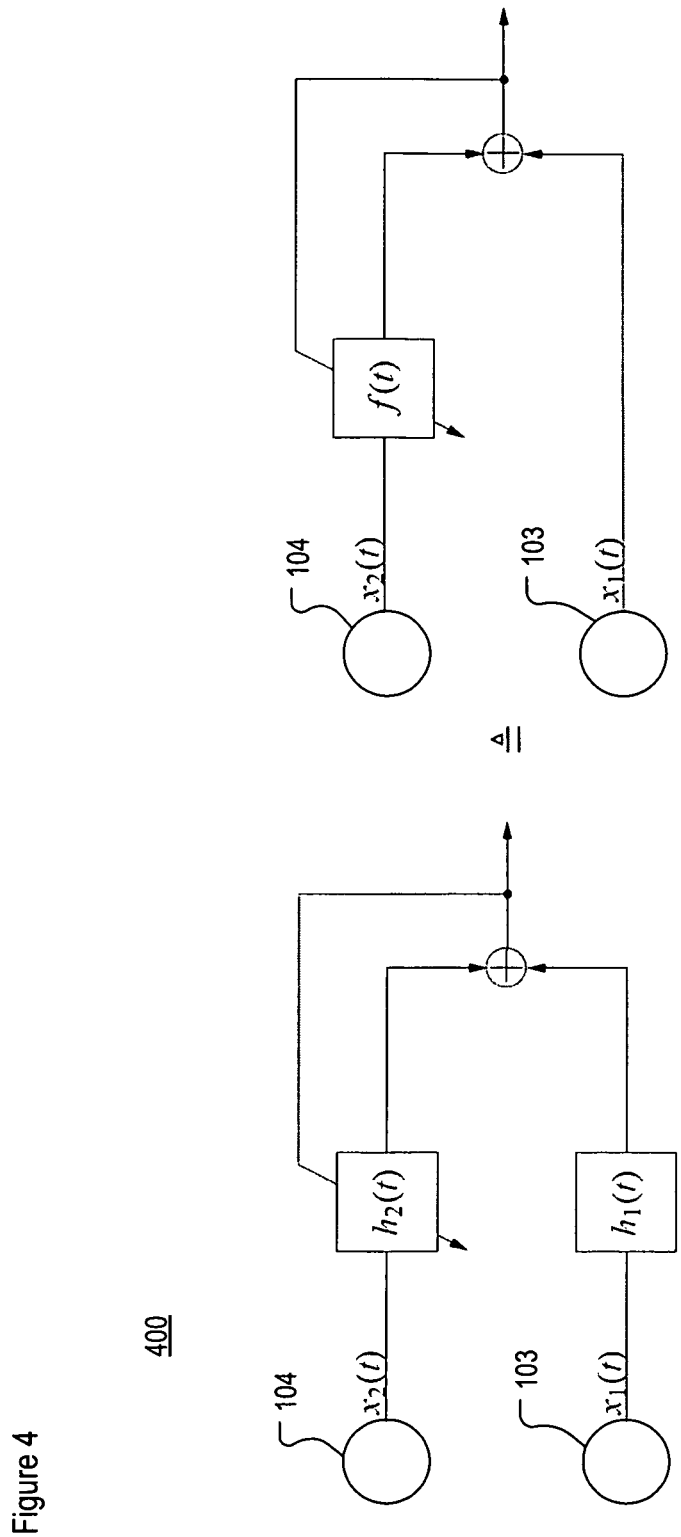
FIG. 4 depicts flow graph 400, which is a flow graph of the calibration method associated with stage 301.

At calibration stage 301, terminal 100 calibrates microphones 103 and 104. At stage 301, terminal 100 also determines the coefficients for the signal filter that signal processor 202 uses during the run-time stage. It will be clear to those skilled in the art, after reading this specification, how to make and use alternative embodiments of the present invention in which the calibration stage is omitted. With respect to the understanding the concept within the illustrative embodiment, FIG. 4 depicts flow graph 400, which is a flow graph of the calibration method associated with stage 301. The task of designing a calibration routine is to find a set of filter coefficients, f(t). The set is used to filter the output of a microphone to be optimized (e.g., microphone 104, etc.) while terminal 100 plays a calibration sound being played through its loudspeaker 102; during the calibration procedure, the filtered output of the optimized microphone is made equal to the unfiltered (or equivalently, undelayed dirac-impulse-response-filtered) output of a reference microphone (e.g., microphone 103, etc.). Mathematically, the calibration procedure can be cast into a general, linear-least-squares problem, or curve fitting problem. The calibration procedure of the illustrative embodiment is described in further detail below and with respect to FIG. 5.

At runtime stage 302, terminal 100 receives sound signals 210 and 220 at microphones 103 and 104, processes the signals into a filtered signal, and transmits the filtered signal over medium 204. The runtime stage is described in further detail below and with respect to FIG. 6.

Figure 5:
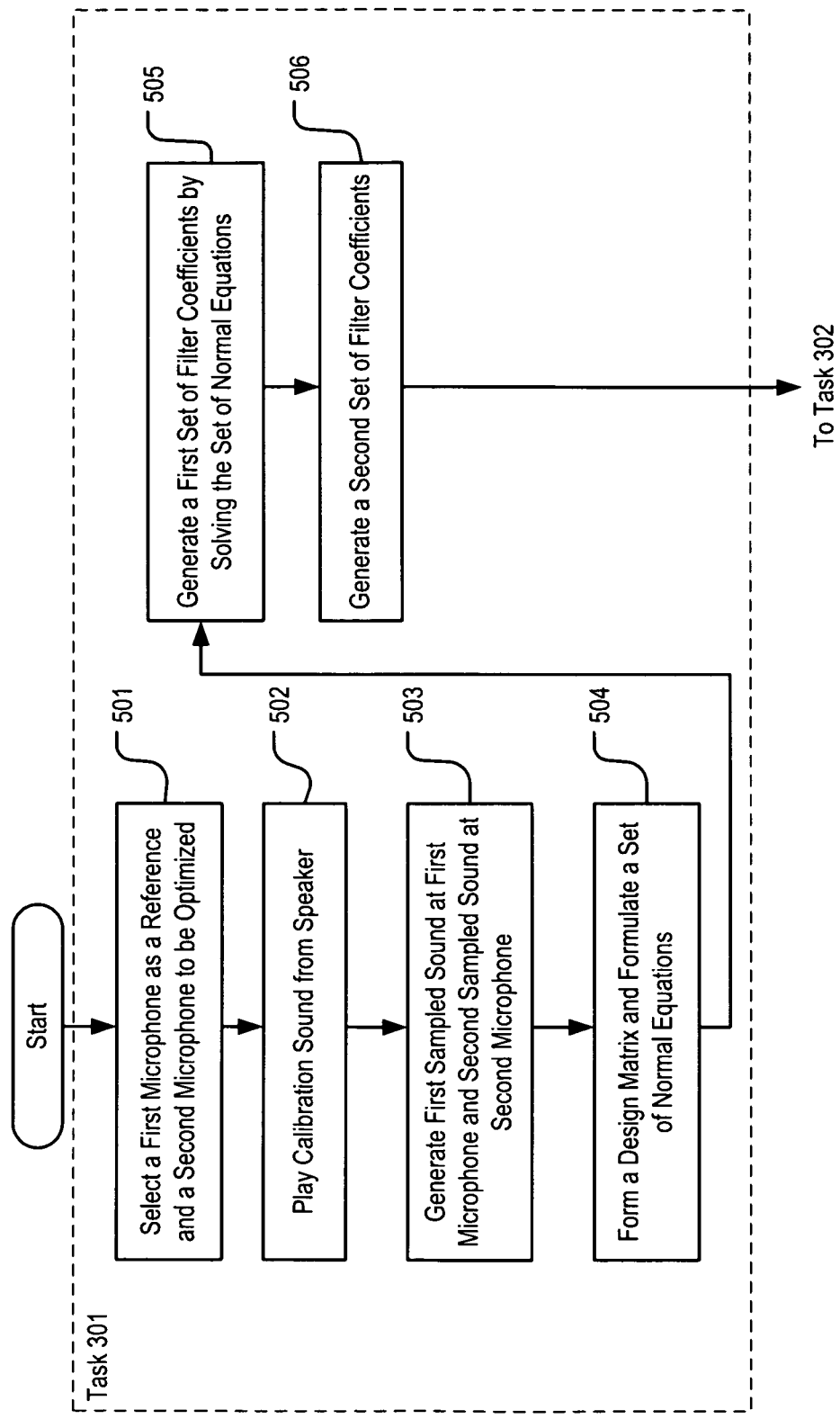
FIG. 5 depicts a flowchart of the salient tasks associated with the execution of calibration stage 301.

FIG. 5 depicts a flowchart of the salient tasks associated with the execution of calibration stage 301. It will be clear to those skilled in the art, after reading this specification, how to perform the tasks associated with FIG. 5 in a different order than presented or to perform the tasks simultaneously.

The calibration stage, in part, is based on the recognition of a near-field versus far-field effect, in which loudspeaker 102 is situated within the near field in relation to microphones 103 and 104, and one or more users are situated during an actual call within the far field in relation to the microphones. By performing both a magnitude and phase equalization on the calibration sound produced by loudspeaker 102 situated within the near field, the calibration stage is able to attenuate sounds emitted by the loudspeaker while allowing sounds to come through from a user in the same direction as the loudspeaker but who is situated in the far field.

At task 501, in some embodiments, terminal 100 selects one microphone as a reference and the other microphone as the one to be optimized. For pedagogical purposes, microphone 103 is the reference and microphone 104 is the microphone to be optimized. As those who are skilled in the art will appreciate after reading this specification, microphones 103 and 104 can in advance be fixed as the reference and optimized microphones, respectively.

At task 502, terminal 100 plays a calibration sound through loudspeaker 102. Terminal 100 plays a wideband sound as the calibration sound (i.e., a sound with components across multiple frequencies) out of the loudspeaker, and captures the acoustic event with the microphones 103 and 104, resulting in the signals $x_1(t)$ and $x_2(t)$, respectfully. In accordance with the illustrative embodiment, the sound to be played comprises a stationary wideband signal, such as white or colored noise over a predetermined bandwidth. In some alternative embodiments, the sound to be played comprises a different type of calibration signal. One example of such a calibration signal is a composite source signal (CSS), as is known in the art. A CSS models the signal that is anticipated during normal operation, namely speech. As those who are skilled in the art will appreciate, in some alternative embodiments, the calibration signal can be any signal with sufficient spectral denseness and which is pleasing to listen to, such as a combination of speech and music.

In an acoustically-controlled environment, a short signal (e.g., 500-1000 milliseconds) is sufficient to find a calibration filter. In practice, the type of acoustic environment where terminal 100 is to be used, such as in a conference room, is often not acoustically-controlled or is only weakly controlled. Therefore, in some embodiments, terminal 100 plays the signal for a length that is on the order of several seconds, in order to allow for background noise effects in a conference room to average out.

At task 503, terminal 100 receives the calibration sound at microphones 103 and 104. As loudspeaker 102 is situated in the near field of microphones 103 and 104, the two microphones record the calibration sound at slightly, but perceptibly, different levels. Microphone 103 produces a first sampled signal, and microphone 104 produces a second sampled signal. Both sampled signals are based on the calibration sound. Furthermore, as indicated in FIG. 4, the sampled signal produced by the optimized microphone—in this example, microphone 104—is adjusted by an updated set of filter coefficients to be produced.

At task 504, terminal 100 forms a design matrix, A, shown below in equation 5, and formulates the normal equations shown below in equation 4. In order to do so, in accordance with the illustrative embodiment terminal 100 fits a set of data points $(\alpha_i, \beta_i)$, $i=0, 1, \ldots, N-1$, to a linear combination of so-called basis functions, $X_j$, $j=0, 1, \ldots, M-1$, such that $$\beta(\alpha) = \sum_{j=0}^{M-1} h_j X_j[\alpha], \quad (\text{eqn. 1})$$

where $h_j$, $j=0, 1, \ldots, M-1$ are scalar weights. In the context of linear least-squares, a merit function that is defined as $$F(a) = \sum_{i=0}^{N-1} \left\{ \beta_i - \sum_{j=0}^{M-1} h_j X_j[\alpha_i] \right\}^2, \quad (\text{eqn. 2})$$

is minimized. To find the minimum, terminal 100 sets to zero the partial derivative of equation 2 with respect to the unknown weights h, as $$\frac{\partial F}{\partial h} = 2 \sum_{i=0}^{N-1} \left\{ \beta_i - \sum_{j=0}^{M-1} h_j X_j[\alpha_i] \right\} X_k(\alpha_i) \overset{!}{=} 0, \quad (\text{eqn. 3})$$

$k = 0, 1, \ldots, M-1.$

This set of linear equations is called normal equations, the representation of which, in matrix notation, reads as $$A^T A h = A^T b, \quad (\text{eqn. 4})$$

where the elements of matrix A are defined as $A_{ij} = X_j(\alpha_i)$, $i=0, 1, \ldots, N-1$ and $j=0, 1, \ldots, M-1$; the elements of vector b are defined as $b_i = \beta_i$, and the elements of vector h are defined as $h_i$. The symbol $^T$ denotes the matrix transposition operator.

The design matrix A of equation 4, of size N×M, becomes $$A = \begin{bmatrix} x_2[0] & 0 & 0 & \ldots & 0 \\ x_2[1] & x_2[0] & 0 & \ldots & 0 \\ x_2[2] & x_2[1] & x_2[0] & \ldots & 0 \\ \vdots & \vdots & \vdots & \ddots & \vdots \\ x_2[N-1] & x_2[N-2] & x_2[N-3] & \ldots & x_2[N-M] \end{bmatrix}. \quad (\text{eqn. 5})$$

The vector h of equation 4, of size M×1, denotes the unknown filter coefficients, f(t), in the time domain. That is, $$h = \{f[0] f[1] f[2] \ldots f[M-1]\}^T, \quad (\text{eqn. 6})$$

and the vector b of equation 4, of size N×1, is the output of the reference microphone (i.e., microphone 103). That is, $$b = \{x_1[0] \, x_1[1] \, x_1[2] \ldots x_1[N-1]\}^T. \quad (\text{eqn. 7})$$

N can be considerably greater than M, which means that the length of the calibration filter can be much smaller than the length of the input signal. As a result, this linear system is generally over-determined, in some embodiments.

In accordance with the illustrative embodiment, M is equal to 80 filter taps. However, it will be clear to those skilled in the art, after reading this specification, how to make and use a calibration filter with a different number of taps. In general, the larger the value of M, the more accurate the calibration filter.

At task 505, terminal 100 generates the set of filter coefficients for optimized microphone 104. In order to do so, terminal 100 solves the normal equations, resulting in a set of filter coefficients being generated and subsequently applied to the optimized microphone (i.e., microphone 104). It is this filter that terminal 100 uses during an actual call. As those who are skilled in the art will appreciate, several options for solving the linear least-squares problem exist, including:

i. an approach based on solving the normal equation $A^T A h = A^T b$ directly,
  ii. an approach based on the QR decomposition of the matrix $A^T A$,
  iii. an approach based on the LU decomposition, and
  iv. an approach based on the singular value decomposition (SVD).

In accordance with the illustrative embodiment, terminal 100 uses the approach based on the QR decomposition for the calibration vector h, which translates into $f(t) = h_2(t)$. As those who are skilled in the art will appreciate, in some alternative embodiments terminal 100 can use a different approach to solving the linear least-squares problem.

At task 506, terminal 100 generates the set of filter coefficients for reference microphone 103. In doing so, terminal 100 sets the filter coefficients for reference microphone 103 to:

$$h_{1,pm}[n] = \begin{cases} -1 & n = 1 \\ 0 & n = 2, 3, \ldots, M, \end{cases} \quad (\text{eqn. 8})$$

which corresponds to a "personal conference" operational mode.

In some alternative embodiments, terminal 100 can set the reference's filter coefficients instead to:

$$h_{1,gcm}[n] = \begin{cases} 1 & n = 1 \\ 0 & n = 2, 3, \ldots, M, \end{cases} \quad \text{(eqn. 9)}$$

which corresponds to a "group conference" operational mode, in which gain is applied omni-directionally. In a variation of group conference operational mode, terminal 100 can alternatively set the reference's filter coefficients to:

$$h_{1,gcm}[n]=0, n=1, 2, \ldots, M, \quad \text{(eqn. 10)}$$

which essentially disables microphone 103, leaving only (the omnidirectional) microphone 104 to contribute to the send response. As those who are skilled in the art will appreciate, a user can select the operational mode by using a switch on terminal 100 or through other means.

Figure 6:
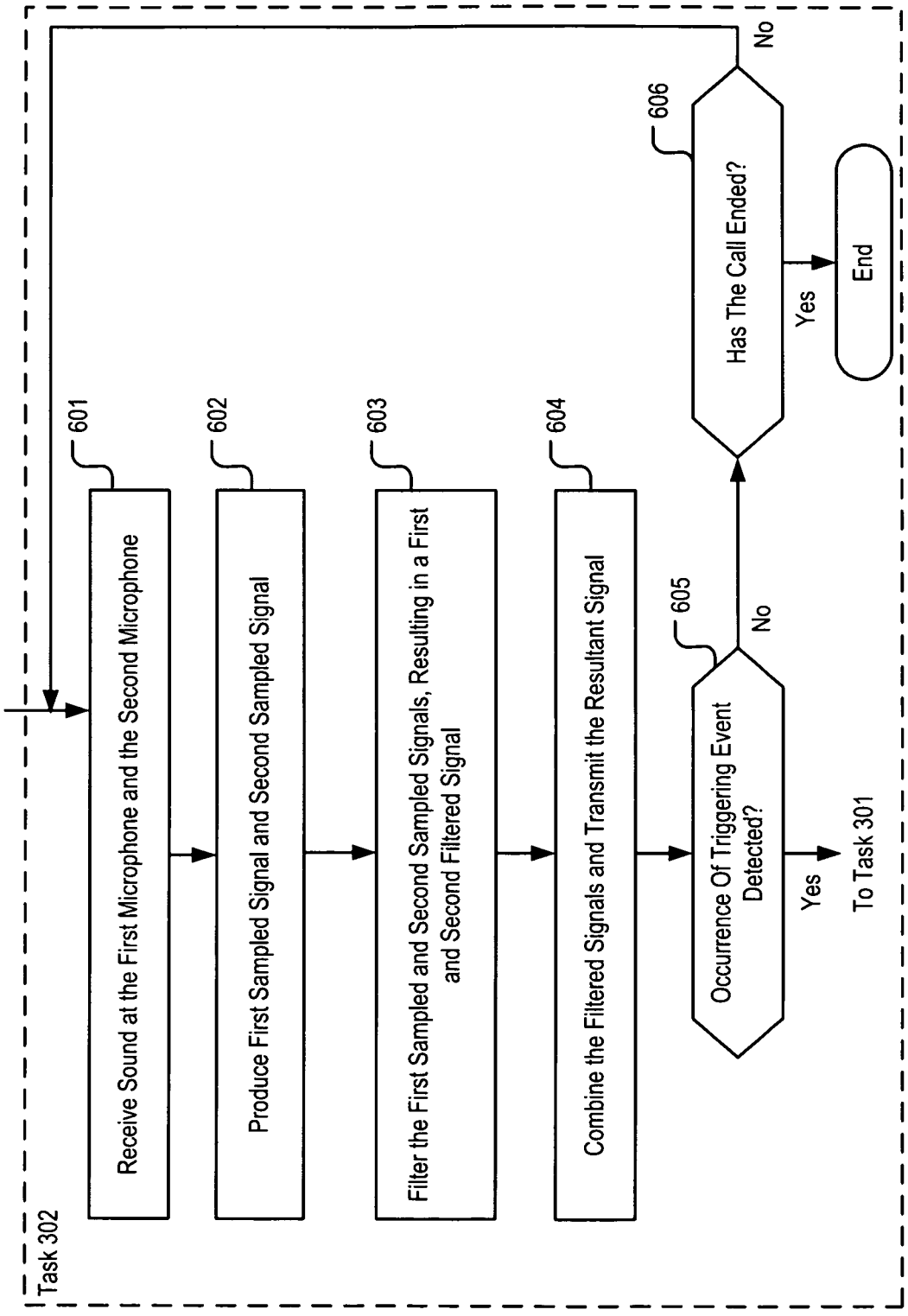
FIG. 6 depicts a flowchart of the salient tasks associated with the execution of run-time stage 302.

FIG. 6 depicts a flowchart of the salient tasks associated with the execution of run-time stage 302. It will be clear to those skilled in the art, after reading this specification, how to perform the tasks associated with FIG. 6 in a different order than presented or to perform the tasks simultaneously.

At task 601, terminal 100 receives ambient sound at microphones 103 and 104, which comprises a combination of sound signals 210 and 220. As the ambient sounds are emitted from sources (e.g., one or more users, etc.) in the far field in relation to microphones 103 and 104, the two microphones record the ambient sounds at substantially the same level, the significance of which is described with respect to task 604.

At task 602, terminal 100 produces a first sampled signal from the signal received by microphone 103 and a second sampled signal from the signal received by microphone 104. Both sampled signals are digital representations of the ambient-sound combination of sound signals 210 and 220.

At task 603, terminal 100 filters the first sampled signal and the second sampled signals at signal processor 202. Signal processor 202 uses the filters defined above and with respect to tasks 505 and 506, in order to produce filtered versions of the signals received from the optimized and reference microphones, respectively (i.e., microphones 104 and 103, respectively).

At task 604, terminal 100 combines the filtered signals from the microphones in well-known fashion. In doing so, terminal 100 determines the differential of the first sampled signal and the second sampled signal. Because the illustrative embodiment of the present invention consists of two microphones, operating the microphones in a differential fashion is the preferred method for achieving a desired spatial response. However, it will be clear to those skilled in the art, after reading this specification, how to make and use alternative embodiments of the present invention in which the microphones are not operated in a differential fashion as stated earlier in this specification. In any case, it will be clear to those skilled in the art, after reading this specification, how to combine the filtered signals.

The filters used in task 603, which were optimized during calibration stage 301 for a near-field calibration sound emitted by loudspeaker 102, overcompensate for the ambient sounds received at task 601, where those ambient sounds are produced by users who are situated in the far field in relation to microphones 103 and 104. As a result of the overcompensation, the filtered signals are combined differentially at task 603 such that the combined signal is not severely attenuated, even for ambient sounds that arrive from a user who is situated in the direction of loudspeaker 102 relative to the microphones, but who is beyond the near field (i.e., "behind" the loudspeaker).

Terminal 100 then transmits the combined signal by using transmitter 203. The filtering and combining of the two microphone signals result in the sound contributed by loudspeaker 102 being attenuated, thereby providing a reduction of acoustic feedback in the transmitted signal.

In some embodiments, terminal 100 determines whether loudspeaker 102 is at least in part the source of the signals received by microphones 103 and 104, from one moment to another. This can be accomplished, for example, in well-known fashion through the use of analog circuitry for detecting whether loudspeaker 102 is producing sound at a particular moment. However, it will be clear to those skilled in the art, after reading this specification, how to make and use alternative embodiments of the present invention in which the detection is performed through digital signal processing such as, for example, automatic pattern recognition of the sampled signals generated by microphones 103 and 104.

In those embodiments in which loudspeaker 102's moment-by-moment contribution to the ambient sound is assessed, if it is determined that the loudspeaker is, in fact, currently contributing to the ambient sound being received, terminal 100 filters the first and second sampled signals arriving from microphones 103 and 104, respectively. This is performed, in order to attenuate the signals arriving from the direction of loudspeaker 102—that is, by applying the $h_2(t)$ filter coefficients generated at task 505. In those same embodiments, if it is determined that loudspeaker 102 is not currently contributing to the ambient sound being received, terminal 100 does not apply the $h_2(t)$ filter coefficients generated at task 505.

At task 605, terminal 100 detects the occurrence of a triggering event. If a triggering event is detected, terminal 100 re-enters the calibration stage, otherwise telecommunication terminal remains in the run-time stage. In re-entering the calibration stage, terminal 100 performs an "in-situ" calibration routine that occasionally (e.g., periodically, sporadically, etc.) refreshes the calibration filter coefficients on-the-fly. This might become necessary as the user moves terminal 100 to a different location without rebooting the terminal.

In accordance with the illustrative embodiment of the present invention, the triggering event corresponds to the pressing of calibrate button 105 by a user. However, it will be clear to those skilled in the art, after reading this specification, how to make and use alternative embodiments of the present invention in which the triggering event corresponds to, for example and without limitation, the passage of time, the recognition of a pattern in the sound received by microphones 103 and 104, the occurrence of a pattern in sound signal 210, the occurrence of a pattern in signal 220, and so forth.

For example, the calibration stage can be executed at predetermined times when a user is not expected to be in the vicinity of terminal 100, such as at night, on non-workdays, and so forth. In a variation of this, terminal 100 can monitor for the presence of ambient sounds in well-known fashion, wherein the set of filter coefficients is refreshed only when no ambient sounds are determined to be present.

It will be clear to those skilled in the art, after reading this specification, how to make and use alternative embodiments of the present invention in which task 605 is omitted.

At task 606, terminal 100 detects in well-known fashion whether the call has ended. If the call has not ended, task execution proceds back to task 601, in order to continue processing the signals. Otherwise, task execution ends.

It is to be understood that the specification teaches just one example of the illustrative embodiment and that many variations of the invention can easily be devised by those skilled in the art after reading this specification and that the scope of the present invention is to be determined by the following claims.

What is claimed is:

1. A method comprising:
receiving an ambient sound at a first microphone and at a second microphone from at least one of i) a person and ii) a loudspeaker,
wherein the person and the loudspeaker are spatially distinct,
wherein the first microphone and the second microphone operate as a differential array with respect to sounds received from the loudspeaker, and
wherein the loudspeaker is located in the near-field of the first microphone and the second microphone, and the person is located in the far-field of the first microphone and the second microphone; and
transmitting an electromagnetic signal that is based on:
i) the ambient sound as received by the first microphone,
ii) the ambient sound as received by the second microphone, and
iii) a filter whose set of recalculable filter coefficients is based on the frequency spectrum of a calibration sound that is transmitted from the loudspeaker, the calibration sound comprising a stationary wideband signal.

2. The method of claim 1 wherein the loudspeaker, the first microphone, and the second microphone are mounted on the body of a telecommunications terminal.

3. The method of claim 2 wherein the distance between the center of the first microphone and the center of the second microphone is around two centimeters.

4. The method of claim 2 wherein the ambient sound originates from a source that is separate from the telecommunications terminal.

5. The method of claim 1 further comprising:
transmitting the calibration sound from the loudspeaker;
receiving the calibration sound at the first microphone and the second microphone, the reception of the calibration sound resulting in i) a first sampled calibration signal being generated that corresponds to the first microphone and ii) a second sampled calibration signal being generated that corresponds to the second microphone; and
generating the set of filter coefficients, based on a frequency equalization of one of i) the first sampled calibration signal and ii) the second sampled calibration signal.

6. The method of claim 5 further comprising sensing a switch actuation, wherein the transmitting of the calibration sound is based on the sensing.

7. A method comprising:
transmitting a calibration sound from a loudspeaker, the calibration sound comprising a wideband signal;
receiving the calibration sound at a first microphone and a second microphone, the reception of the calibration sound resulting in i) a first sampled calibration signal being generated that corresponds to the first microphone and ii) a second sampled calibration signal being generated that corresponds to the second microphone; and
generating a set of recalculable filter coefficients that is based on i) the frequency spectrum of the first sampled calibration signal and ii) the frequency spectrum of the second sampled calibration signal,
wherein the first microphone and the second microphone operate as a differential array with respect to sounds received from the loudspeaker.

8. The method of claim 7 wherein the set of filter coefficients is also based on the difference between the first and second sampled calibration signals.

9. The method of claim 8 wherein the first sampled calibration signal is used to construct the set of filter coefficients.

10. The method of claim 7 wherein the set of filter coefficients is also based on treating the loudspeaker as being within the near-field of first and second microphones.

11. The method of claim 7 further comprising:
receiving an ambient sound at the first microphone and at the second microphone from at least one of i) a person and ii) the loudspeaker, wherein the person and the loudspeaker are spatially distinct; and
transmitting an electromagnetic signal that is based on:
i) the ambient sound as received by the first microphone,
ii) the ambient sound as received by the second microphone, and
iii) a filter that is defined by the set of filter coefficients.

12. The method of claim 7 wherein the loudspeaker, the first microphone, and the second microphone are mounted on the body of a telecommunications terminal.

13. The method of claim 7 further comprising sensing a switch actuation, wherein the generating of the set of filter coefficients is based on the sensing.

14. The method of claim 7 further comprising monitoring for the presence of ambient sounds, wherein the set of filter coefficients is refreshed only when no ambient sounds are determined to be present.

15. The method of claim 7 wherein the set of filter coefficients is determined prior to a telephone call.

16. The method of claim 7 wherein the wideband signal is stationary.

17. The method of claim 7 wherein the wideband signal is a composite source signal.

18. A method comprising:
transmitting a calibration sound from a loudspeaker mounted on the body of a telecommunications terminal, the calibration sound comprising a stationary wideband signal;
receiving the calibration sound at a first microphone and a second microphone mounted on the body of the telecommunications terminal, the reception of the calibration sound resulting in i) a first sampled calibration signal being generated that corresponds to the first microphone and ii) a second sampled calibration signal being generated that corresponds to the second microphone, wherein the first microphone and the second microphone operate as a differential array with respect to sounds received from the loudspeaker;
generating a set of recalculable filter coefficients that is based on i) the frequency spectrum of the first sampled calibration signal and ii) the frequency spectrum of the second sampled calibration signal; and
transmitting, from the telecommunications terminal, an electromagnetic signal that is intended for at least one other telecommunications terminal, the electromagnetic signal being based on:
i) an ambient sound as received by the first microphone from at least one of:
a) a person, and
b) the loudspeaker,
ii) the ambient sound as received by the second microphone, and
iii) a filter that is defined by the set of filter coefficients.

19. The method of claim 18 wherein the set of filter coefficients is also based on the difference between the first and second sampled calibration signals.

20. The method of claim 19 wherein the first sampled calibration signal is used to construct the set of filter coefficients.

* * * * *